(12) United States Patent
Shimada et al.

(10) Patent No.: US 6,861,168 B2
(45) Date of Patent: Mar. 1, 2005

(54) HYDROGEN SUPPLY DEVICE (75) Inventors: Toshiaki Shimada, Wako (JP); Yoshio Nuiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 494 days.

(21) Appl. No.: 09/975,925

(22) Filed: Oct. 12, 2001

(65) Prior Publication Data

US 2002/0045079 A1 Apr. 18, 2002

(30) Foreign Application Priority Data

Oct. 12, 2000 (JP) .................................. 2000-312551

(51) Int. Cl.[7] .................. H01M 8/04; H01M 8/06; F17C 11/00
(52) U.S. Cl. ..................... 429/20; 429/24; 429/26
(58) Field of Search ................ 429/17, 19, 20, 429/24, 26

(56) References Cited

U.S. PATENT DOCUMENTS 5,366,820 A * 11/1994 Tsutsumi et al. ............. 429/19
5,962,155 A * 10/1999 Kuranaka et al. ............. 429/20
6,195,999 B1    3/2001 Arnold et al. ................. 60/649

FOREIGN PATENT DOCUMENTS

| JP | 61-220009 | 9/1986 |
| JP | 1-216024 | 8/1989 |
| JP | 2859045 | 12/1998 |
| JP | 2000-12056 | 1/2000 |

* cited by examiner

*Primary Examiner*—Jonathan Crepeau
(74) *Attorney, Agent, or Firm*—Lahive & Cockfield, LLP; Anthony A. Laurentano, Esq.

(57) ABSTRACT

The present invention is to provide a hydrogen supply device having a simple constitution which can be made small and light. In the present invention, a hydrogen occlusion tank is provided in a duct. A heat exchange tube is provided upstream from the hydrogen occlusion tank inside the duct. A first fan leads outside air into the duct, and cooling water, which has cooled a fuel cell, is led into the heat exchange tube. A hydrogen occluding alloy is accommodated in the hydrogen occlusion tank, and hydrogen released from the hydrogen occluding alloy is supplied via hydrogen supply pipes and a flow control valve to the fuel cell. Outside air passes through the heat exchange tube and is thereby heated; the heated outside air passes around the perimeter of the hydrogen occlusion tank, thereby heating the hydrogen occlusion tank.

8 Claims, 5 Drawing Sheets

HYDROGEN SUPPLY DEVICE

BACKGROUND OF THE INVENTION

1. Field of the Invention

The present invention relates to a hydrogen supply device which supplies hydrogen, occluded in a hydrogen occluding alloy, to an apparatus which uses hydrogen, such as a fuel cell or a hydrogen engine.

2. Description of the Related Art

A great number of conventional systems have been developed for releasing hydrogen from a hydrogen occluding alloy, which hydrogen is occluded in, and supplying the hydrogen to a hydrogen-using apparatus, such as a fuel cell mounted in a moving body, such as a vehicle (e.g. Japanese Unexamined Patent Application, First Publications Nos. Sho 61-220009 and Hei 1-216024).

In the hydrogen occluding alloy, the input and output of heat accompanies the occlusion and release of hydrogen; when occluding the hydrogen, the heat must be discharged from the hydrogen occluding alloy; when releasing the hydrogen, heat must be supplied to the hydrogen occluding alloy. The amount of heat at this time is enormous, being 20 to 40 kJ per one mol of hydrogen. The amount of heat needed to release hydrogen is achieved by the heat capacity of the hydrogen occluding alloy, and as a result, the temperature of the hydrogen occluding alloy decreases.

Figure 4:
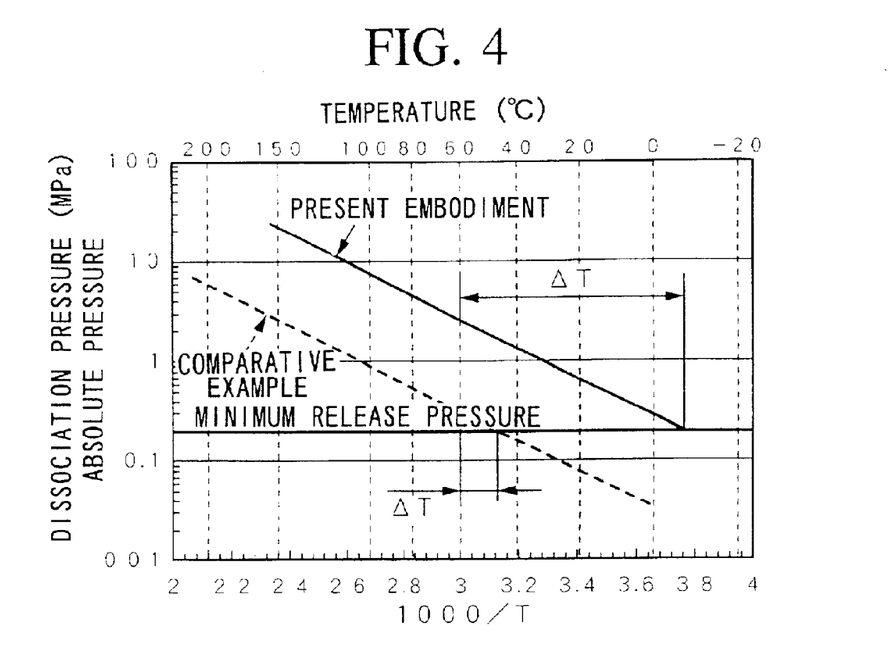
FIG. 4 is a diagram showing dissociation pressure characteristics of a hydrogen occluding alloy.

Generally, the hydrogen dissociation pressure of the hydrogen occluding alloy increases as the alloy temperature rises, and when the temperature of the hydrogen occluding alloy decreases as the hydrogen is released, the hydrogen dissociation pressure (hereinafter abbreviated as "dissociation pressure") drops. FIG. 4 shows dissociation pressure characteristics, the vertical axis representing dissociation pressure (absolute pressure) and the horizontal axes representing temperature (the top side expressed in degrees C., the bottom side expressed by a reciprocal of the absolute temperature T multiplied by one-thousand). In FIG. 4, the solid line and broken line represent two types of hydrogen occluding alloys having different dissociation pressure characteristics. The minimum release pressure represents the minimum dissociation pressure needed to supply hydrogen to the hydrogen-using apparatus, and when the dissociation pressure drops below the minimum release pressure, it becomes impossible to supply hydrogen. Therefore, when the temperature of the hydrogen occluding alloy has decreased during the release of hydrogen, the hydrogen occluding alloy must be heated to ensure that the dissociation pressure does not fall below the minimum release pressure. For this reason, conventional system generally provide a heat exchanger for the hydrogen occluding alloy.

When hydrogen is released from the hydrogen occluding alloy, the heat exchanger heats the hydrogen occluding alloy, and when occluding hydrogen in the hydrogen occluding alloy, the heat exchanger cools the hydrogen occluding alloy.

Conventionally, cooling water of a hydrogen-using apparatus, such as a fuel cell, is used as the heating medium of the heat exchanger. Since the cooling water, which has been used to cool the hydrogen-using apparatus, attains a high temperature, the cooling water is supplied as a heating medium to the heat exchanger, applying heat to the hydrogen occluding alloy while hydrogen is being released.

However, when cooling water is used as the heating medium for the heat exchanger, a cooling water circuit for feeding back the cooling water must be provided between the hydrogen-using apparatus and the hydrogen occluding alloy, making the device complex and large. Furthermore, the increase in the amount of cooling water being held consequently increases the weight of the device.

SUMMARY OF THE INVENTION

Accordingly, it is an object of the present invention to provide a hydrogen supply device having a simple constitution which can be made small and light, by using air as the heating medium for heating the hydrogen occluding alloy when releasing hydrogen.

In order to achieve the above objects, a hydrogen supply device according to a first aspect of the invention comprises a hydrogen-using apparatus which uses hydrogen; a hydrogen occlusion tank, which a hydrogen occluding alloy is accommodated in; a hydrogen supply unit which supplies hydrogen, released from the hydrogen occlusion tank, to the hydrogen-using apparatus; a mixing unit which mixes air warmed by heat generated when the hydrogen-using apparatus consumes hydrogen, with air having a different temperature from the warmed air; and a heating unit which heats the hydrogen occlusion tank by using the mixed air.

In this constitution, exhaust heat which is generated by the hydrogen-using apparatus can be used as the heat source for heating the hydrogen occlusion tank, obtaining the excellent effect of effectively using energy. Further, since air is used as the heating medium, the constitution of the device can be simplified and its weight can be reduced. Furthermore, the temperature of air which heats the hydrogen occlusion tank can be controlled to a predetermined temperature by mixing air having a different temperature, without reducing the amount of air which supplied to the hydrogen occlusion tank. Moreover, the heat exchange between the hydrogen occlusion tank, the hydrogen occluding alloy, and the air, is achieved more efficiently and easily, compared with the case that the heat exchange is performed by regulating the amount of the flowing heating medium.

According to a second aspect of the invention, in the hydrogen supply device of the first aspect, the hydrogen-using apparatus comprises a flow control unit which controls the flow amount of the warmed air and the air having a different temperature, and the flow control unit is controlled in accordance with a temperature required by the hydrogen occluding alloy.

In this constitution, the hydrogen occluding alloy can be constantly kept at a required temperature (the temperature of which hydrogen can be released from the hydrogen occluding alloy) by controlling the temperature of the heating medium.

According to a third aspect of the invention, in the hydrogen supply device of the first aspect, further comprises a hydrogen storage tank which (compressively) stores hydrogen, and hydrogen in the hydrogen storage tank is supplied to the hydrogen-using apparatus when the temperature of the warmed air is insufficient to release hydrogen from the hydrogen occlusion tank.

In this constitution, the supply of hydrogen to the hydrogen-using apparatus can be made stable.

According to a fourth aspect of the invention, in the hydrogen supply device of the third aspect, hydrogen in the hydrogen occlusion tank is supplied to the hydrogen storage tank when the hydrogen-using apparatus stops operating.

In this constitution, when hydrogen cannot be supplied to the hydrogen-using apparatus from the hydrogen occlusion tank at the start of next operation because the temperature of the hydrogen occluding alloy has fallen below the minimum release pressure, the hydrogen which is stored in the hydrogen storage tank is supplied to the hydrogen-using apparatus instead, and therefore, the amount of time in which the hydrogen-using apparatus cannot be operated is reduced.

In the hydrogen supply device as described above, a fuel cell which generates electricity and heat by the chemical reaction of hydrogen and atmospheric oxygen is used as the hydrogen-using apparatus for example. Furthermore, it is preferable that the warmed air comprises exhaust air which was exhausted from the fuel cell and containing water.

In this constitution, since damp air containing water has a greater amount of heat than dry air, and the heat exchange between the hydrogen occlusion tank, the hydrogen occluding alloy, and the air, is achieved more efficiently. Therefore, the hydrogen occluding alloy can be heated more speedily, and a large amount of hydrogen can be released from the hydrogen occluding alloy.

DESCRIPTION OF THE PREFERRED EMBODIMENTS

Preferred embodiments of the hydrogen supply device according to the present invention will be explained with reference to FIGS. 1 to 6.

Embodiment 1

A first embodiment of the hydrogen supply device according to the present invention will be explained with reference to FIGS. 1 to 5.

Figure 1:
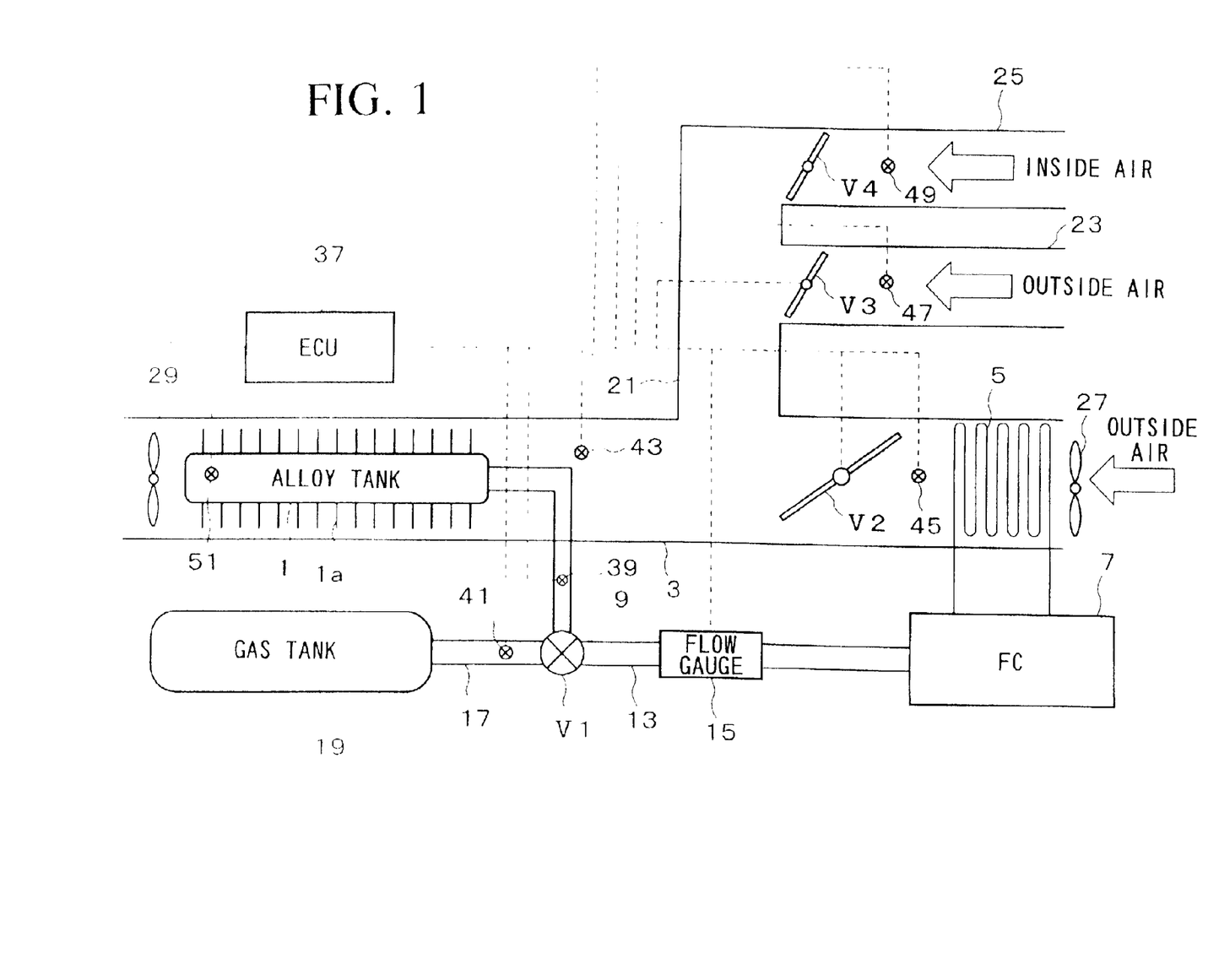
FIG. 1 is a diagram showing the constitution of a fuel cell system for vehicle comprising the hydrogen supply device according to a first embodiment of the present invention.

FIG. 1 shows the constitution of a fuel cell system for vehicle comprising a hydrogen supply device. A hydrogen occlusion tank 1 contains a hydrogen occluding alloy, and is provided downstream in a duct (heating unit) 3. The hydrogen occlusion tank 1 comprises stainless steel (SUS304) and is pressure-resistant to 10 MPa. A great number of fins 1a are provided around the outer face of the hydrogen occlusion tank 1. The hydrogen occlusion tank 1 is filled with a hydrogen occluding alloy to a fill rate of 50%. The hydrogen occluding alloy, which is filled in the hydrogen occlusion tank 1, is an $LaNi_5$ alloy having the dissociation pressure characteristics shown by the solid line in FIG. 4, and has dissociation pressure of more than 10 atmospheric pressure at 40 degrees C.

A heat exchange tube (heating unit) 5 is provided inside the duct 3 upstream from the hydrogen occlusion tank 1. The heat exchange tube 5 is connected to an unillustrated cooling circuit of a fuel cell (indicated by reference code FC in FIG. 1) 7, provided outside the duct 3, and feeds back cooling water of the fuel cell 7. The fuel cell 7, which comprises the hydrogen-using apparatus, generates electricity by the chemical reaction of hydrogen and atmospheric oxygen; the cooling water eliminates heat, generated when the fuel cell 7 is generating electricity. Cooling the fuel cell 7 heats to the cooling water, which is then fed along the heat exchange tube 5. While passing through the heat exchange tube 5, the cooling water is exchanged with air, which flows in the duct 3, thereby cooling the cooling water and returning it to the cooling water circuit of the fuel cell 7. That is, the heat exchange tube 5 can be described as a cooling radiator of the fuel cell 7.

The hydrogen, which is released from the hydrogen occluding alloy in the hydrogen occlusion tank 1, is supplied via a hydrogen supply pipe 9, a flow control valve V1, and a hydrogen supply pipe 13, to the fuel cell 7. In this embodiment, the hydrogen supply pipe 9, the flow control valve V1, and the hydrogen supply pipe 13 comprise a hydrogen supply unit. The hydrogen supply pipe 13 is equipped with a flow gauge 15. The hydrogen in the hydrogen occlusion tank 1 can also be supplied via the hydrogen supply pipe 9, the flow control valve V1, and a hydrogen supply pipe 17 to a hydrogen storage tank (shown as a gas tank in FIG. 1) 19, provided outside the duct 3. The hydrogen in the hydrogen storage tank 19 is supplied to the fuel cell 7 when hydrogen cannot be released from the hydrogen occluding alloy due to low temperature, and consequently cannot be supplied from the hydrogen occlusion tank 1 to the fuel cell 7. By changing the position of the valve body of the flow control valve V1, it is possible to switch the flow of hydrogen among four different paths. In the first valve body position, the hydrogen supply pipe 9 and hydrogen supply pipe 13 are joined together but the hydrogen supply pipe 17 is closed; in the second valve body position, the hydrogen supply pipe 9 and hydrogen supply pipe 17 are joined together but the hydrogen supply pipe 13 is closed; in the third valve body position, the hydrogen supply pipe 13 and hydrogen supply pipe 17 are joined together but the hydrogen supply pipe 9 is closed; and in the fourth valve body position, all the hydrogen supply pipes 9, 13, and 17 are closed.

On the other hand, in the duct 3, a conflux duct 21 joins the hydrogen occlusion tank 1 to the heat exchange tube 5; the conflux duct 21 is connected to an outside air duct 23 which can lead outside air, and an inside air duct 25, which can lead air inside the vehicle. In this embodiment, the conflux duct 21, the outside air duct 23, and the inside air duct 25 form a mixing unit.

In the duct 3, a first fan 27 is provided upstream from the heat exchange tube 5, and a second fan 29 is provided downstream from the hydrogen occlusion tank 1. An unillustrated drive motor of the fans 27 and 29 is electrically connected to a central electronic control unit (hereinafter abbreviated as "ECU") 37, and switch ON/OFF based on commands from the ECU 37.

In the duct 3, a flow control valve V2 is provided between the heat exchange tube 5 and the junction with the conflux duct 21. Furthermore, flow control valves V3 and V4 are provided respectively to the outside air duct 23 and the inside air duct 25. An unillustrated actuator drives the valve bodies of the flow control valves V2 to V4, and is electrically connected to the ECU 37; the actuator adjusts the openings of the valve bodies in accordance with command values from the ECU 37. In this embodiment, the flow control valves V2 to V4 form a flow control unit.

Pressure sensors 39 and 41 are provided to the hydrogen supply pipe 9 and the hydrogen supply pipe 17, and transmit signals corresponding to the detected outputs to the ECU 37.

In the duct 3, temperature sensors 43 and 45 are provided between the hydrogen occlusion tank 1 and the junction with the conflux duct 21, and between the heat exchange tube 5 and the flow control valve V2. Temperature sensors 47 and 49 are provided to the outside air duct 23 and the inside air duct 25. Furthermore, a temperature sensor 51 for detecting the temperature of the hydrogen occluding alloy, accommodated inside the hydrogen occlusion tank 1, is provided inside the hydrogen occlusion tank 1. The temperature sensors 43, 45, 47, 49, and 51 send output signals corresponding to the detected temperatures to the ECU 37.

In the hydrogen supply device of the fuel cell having the above constitution, in order to supplement the heat which is taken by the hydrogen occluding alloy inside the hydrogen occlusion tank 1 when releasing hydrogen, outside air, which has been led into the duct 3 by the first fan 27, is heat-exchanged with the cooling water of the fuel cell 7, flowing in the heat exchange tube 5, and the heated outside air is fed around the hydrogen occlusion tank 1, thereby absorbing the heat of the outside air from the fins 1*a*.

To stabilize the supply of hydrogen to the fuel cell 7, the pressure in the hydrogen occlusion tank 1 is kept constant. For this reason, the temperature of the hydrogen occluding alloy (i.e. the temperature inside the hydrogen occlusion tank 1) is controlled so as to correspond to the temperature when the dissociation pressure is set as the constant pressure. In this embodiment, the control temperature in the hydrogen occlusion tank 1 is 40 degrees C.

In controlling the temperature of the hydrogen occlusion tank 1 in the hydrogen supply device, the outside air which is fed from the outside air duct 23, the inside air which is fed from the inside air duct 25, and the outside air which has been fed from the upstream of the duct 3 and heated in the heat exchange tube 5 (hereinafter abbreviated as "heated outside air" to distinguish it from the outside air which is fed from the outside air duct 23) are mixed according to a predetermined flow ratio, whereby the amount of heat required to maintain the predetermined temperature in the hydrogen occlusion tank 1 is supplied thereto.

More specifically, based on the signal output from the temperature sensor 51, the ECU 37 calculates the temperature of the hydrogen occluding alloy, the temperature drop rate, and the like, and from these values calculates the temperature of the air which should be supplied to the hydrogen occlusion tank 1 (hereinafter termed "target air temperature"). In addition, based on signals output from the temperature sensors 43, 45, 47, and 49, the ECU 37 calculates the temperature of the air supplied to the hydrogen occlusion tank 1, the temperature of the heated outside air, the temperature of the outside air which has been fed from the outside air duct 23, and the temperature of the air inside the vehicle which has been fed from the inside air duct 25, and calculates a flow ratio of the heated outside air, the outside air, and the inside air, which will ensure that the air temperature detected by the temperature sensor 43 is the target air temperature. The ECU 37 calculates openings of the flow control valves V2, V3, and V4 which will achieve the above flow ratio, and outputs signals corresponding to these openings to the actuator of the flow control valves V2, V3, and V4. The flow ratio control (i.e. control of the openings of the flow control valves V2, V3, and V4) can be achieved by using PID control, feed-forward control, or feedback control.

In the hydrogen supply device described above, hydrogen is usually supplied to the fuel cell 7 from the hydrogen occlusion tank 1. However, in cold locations and the like, when hydrogen cannot be supplied to the fuel cell 7 from the hydrogen occlusion tank 1 at the start of operation because the temperature of the hydrogen occluding alloy has fallen below the minimum release pressure, the hydrogen which is stored in the hydrogen storage tank 19 is supplied to the fuel cell 7 instead. Hydrogen is supplied in this way until the hydrogen occlusion tank 1 reaches a temperature which hydrogen can be released at by discharge of heat from the fuel cell 7. Hydrogen is stored in the hydrogen storage tank 19 as appropriate when the fuel cell vehicle stops moving, i.e. when the fuel cell 7 stops operating.

Figure 2:
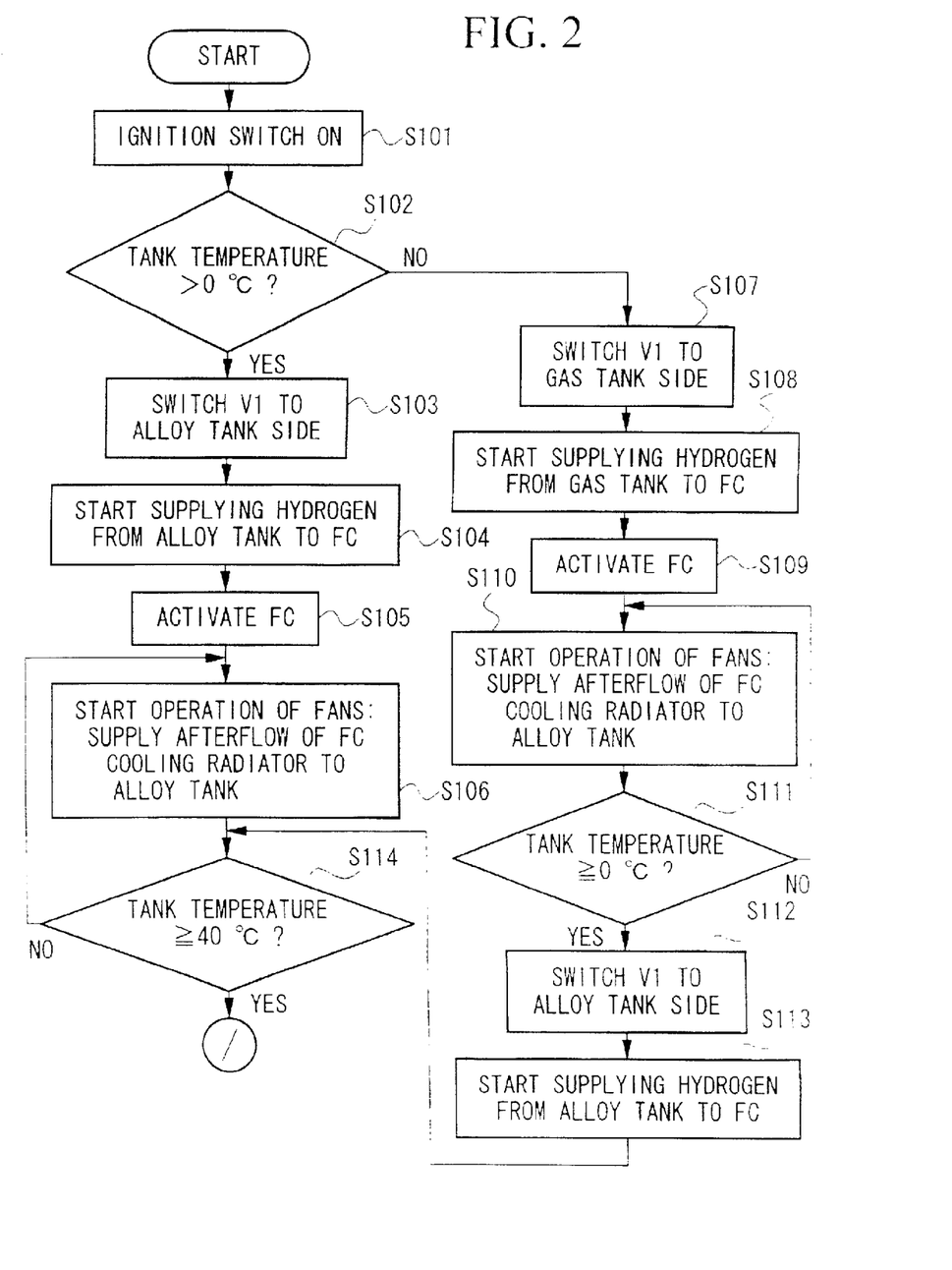
FIG. 2 is a flowchart (part one) of a hydrogen supply process in the first embodiment.
Figure 3:
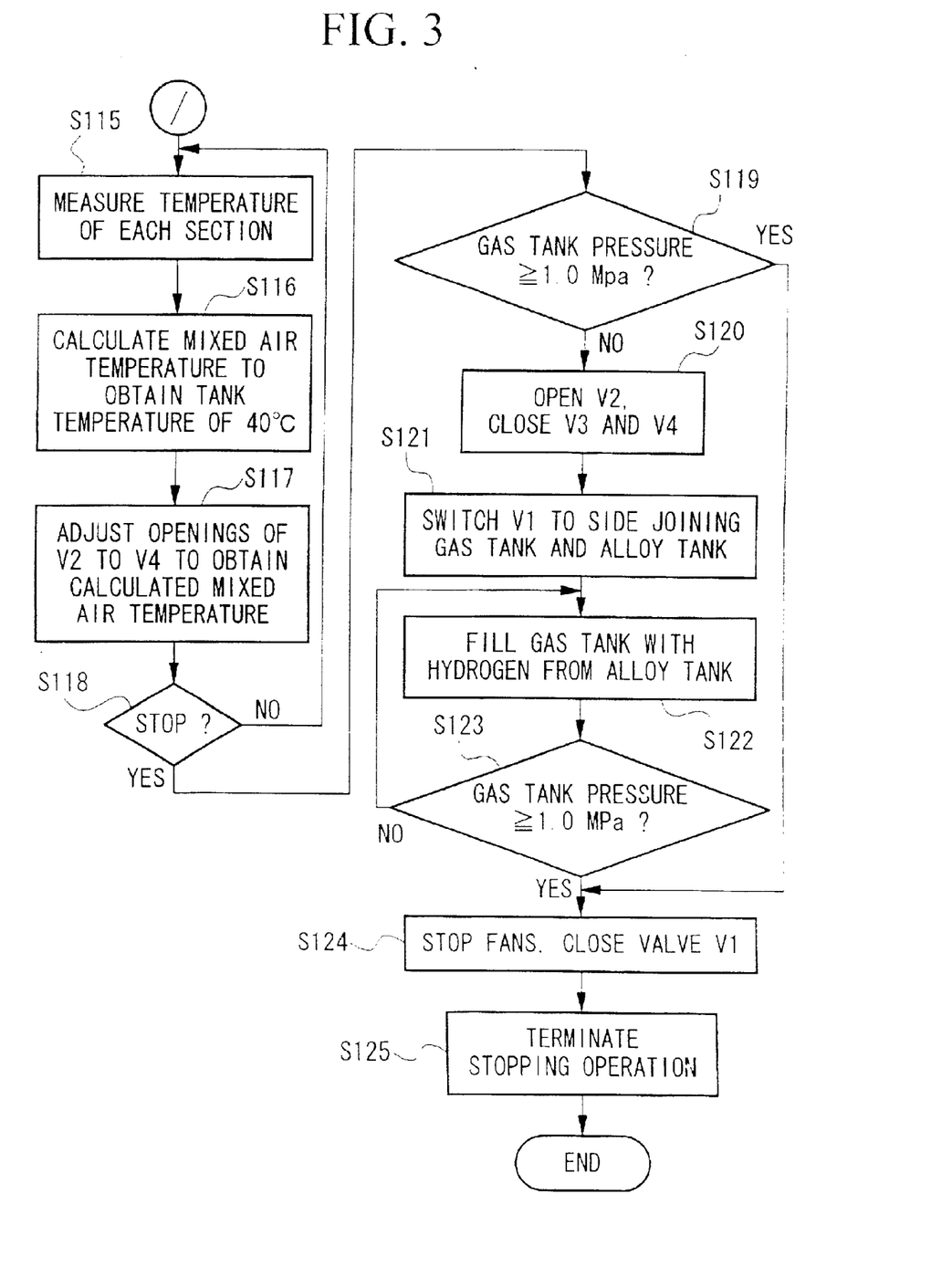
FIG. 3 is a flowchart (part two) of a hydrogen supply process in the first embodiment.

Subsequently, a process of supplying hydrogen to the fuel cell will be explained with reference to FIGS. 2 and 3. In the hydrogen supply process shown in FIGS. 2 and 3, the temperature inside the hydrogen occlusion tank 1 is controlled to 40 degrees C., and the pressure inside the hydrogen storage tank 19 is controlled to 1.0 MPa. By applying the constitution described above, the excess amount of heat needed when the device is mounted in a vehicle can be obtained by using the heat of the hydrogen occluding alloy itself. Therefore, the amount of heat per time unit supplied to the hydrogen occlusion tank 1 from the outside can be reduced (see FIG. 5).

Firstly, when the fuel cell vehicle starts operating, the ECU 37 receives an ignition switch ON signal (step S101), and proceeds to step S102, where it is determined, based on the outer signal of the temperature sensor 51, whether the temperature in the hydrogen occlusion tank 1 has exceeded 0 degrees C.

When the determination of step S102 is affirmative, hydrogen can be released from the hydrogen occluding alloy. Therefore, the ECU 37 proceeds to step S103, positioning the valve body of the flow control valve V1 so as to join the flow control valve 9 and the flow control valve 13, connecting the hydrogen occlusion tank 1 to the fuel cell 7, and starts supplying hydrogen from the hydrogen occlusion tank 1 to the fuel cell 7 (step S104), thereby activating the fuel cell 7 (step S105). Subsequently, in step S106, the ECU 37 starts operation of the first fan 27 and the second fan 29, closes the flow control valves V3 and V4, and completely opens the flow control valve V2, feeding outside air, which has been heated in the heat exchange tube 5, to the hydrogen occlusion tank 1.

Oh the other hand, when the determination of step S102 is negative, hydrogen cannot be released from the hydrogen occluding alloy. Therefore, in step S107, the ECU 37 positions the valve body of the flow control valve V1 so as to join the flow control valve 13 and the flow control valve 17, connecting the hydrogen storage tank 19 to the fuel cell 7, and starts the supply of hydrogen from the hydrogen storage tank 19 to the fuel cell 7 (step S108), thereby activating the fuel cell 7 (step S109).

Following step S109, in S110 the ECU 37 starts the operation of the first fan 27 and the second fan 29, closes the flow control valves V3 and V4, and completely opens the flow control valve V2, feeding outside air, which has been heated in the heat exchange tube 5, to the hydrogen occlusion tank 1. Subsequently, in step S111, the ECU 37 determines whether the temperature of the hydrogen occlusion tank 1 has exceeded zero degrees C. When the temperature of the hydrogen occlusion tank 1 has not exceeded zero degrees C., processing returns to step S110, continuing the supply of hydrogen from the hydrogen storage tank 19 and heating the hydrogen occlusion tank 1 with heated outside air. Oh the other hand, when it is determined that the temperature of the hydrogen occlusion tank 1 has exceeded zero degrees C., processing proceeds to step S112, where the ECU 37 positions the valve body of the flow control valve V1 so as to join the flow control valve 9 and the flow control valve 13, connecting the hydrogen occlusion tank 1 to the fuel cell 7, and starts the supply of hydrogen from the hydrogen occlusion tank 1 to the fuel cell 7 (step S113).

In step S114, subsequent to step S106 or step S113, it is determined whether the temperature of the hydrogen occlusion tank 1 is greater than 40 degrees C. When this determination is negative, the ECU 37 returns to step 106, continuing the supply of hydrogen from the hydrogen occlusion tank 1 and heating the hydrogen occlusion tank 1 with heated outside air. Oh the other hand, when the determination in step S114 is affirmative, the ECU 37 proceeds to step S115. The affirmative determination of step S114 ends the control of the start of operation, shifting to normal drive control.

In normal drive control, in step S115, the temperature of each section is detected based on the signals output from the temperature sensors 43, 45, 47, 49, and 51. In step S116, the ECU 37 calculates a temperature of the mixed air (target air temperature) which will achieve a temperature of the hydrogen occlusion tank 1 of 40 degrees C. Next, in step S117, the ECU 37 calculates openings of the flow control valves V2 to V4 to achieve the target air temperature, and outputs a control signal to the actuator of the flow control valves V2 to V4. Proceeding to step S118, it is determined whether there is a command to stop operating. When the determination result of step S118 is negative, processing returns to step S115. Therefore, during normal driving, the processes of steps S115 to S117 are executed continuously unless there is a command to stop operating. When the determination result of step S118 is affirmative, processing proceeds to step S119. An affirmative determination in step S118 ends the control of the start of operation, shifting to normal drive control.

When operation stops, it is determined in step S119 whether the pressure in the hydrogen storage tank 19 is greater than 1.0 MPa based on the signal output from the pressure sensor 41. An affirmative determination result in step S119 is confirmation that the amount of hydrogen stored in the hydrogen storage tank 19 is sufficient for supplying the fuel cell 7 at the start of the next operation. Consequently, processing proceeds to step S124, where the ECU 37 stops the first fan 27 and second fan 29, positions the valve body of the flow control valve V1 so as to completely close all the flow control valves 9, 13, and 17, ending the stop operation (step S125).

On the other hand, when the determination in step S119 is negative, the ECU 37 proceeds to step S120, completely opening the flow control valve V2 and completely closing the flow control valves V3 and V4. Furthermore, in step S121, the ECU 37 positions the valve body of the flow control valve V1 so as to join the flow control valve 9 and the flow control valve 17, connecting the hydrogen occlusion tank 1 to the hydrogen storage tank 19, and fills the hydrogen storage tank 19 with hydrogen from the hydrogen occlusion tank 1 (step S122). The hydrogen storage tank 19 is refilled prior to stopping the driving operation in this way for the reason that, when step S119 has been determined negatively, there is an anxiety that there will be insufficient hydrogen it becomes necessary to supply hydrogen from the hydrogen storage tank 19 to the fuel cell 7 at the start of the next driving operation.

After step S122 processing proceeds to step S123, where it is determined whether the pressure in the hydrogen storage tank 19 is greater than 1.0 MPa. When the determination in step S123 is negative, processing returns to step S122 and the process of filling of the hydrogen storage tank 19 with hydrogen continues. When the determination in step S123 is affirmative, processing proceeds to step S124, in which the first fan 27 and the second fan 29 are stopped, the valve body of the flow control valve V1 is positioned so that all the hydrogen supply pipes 9, 13, and 17 are closed, and the stop operation ends (step S125).

In the hydrogen supply device of this embodiment, an $LaNi_5$ type hydrogen occluding alloy having the dissociation pressure characteristics shown by the solid line in FIG. 4 is used as the hydrogen occluding alloy, which is filled in the hydrogen occlusion tank 1. This will be explained based on FIGS. 4 and 5. In FIG. 4, the broken line shows the dissociation pressure characteristics of a conventional hydrogen occluding alloy as a comparative example. For sake of convenience in the following explanation, the hydrogen occluding alloy having the dissociation pressure characteristics shown by the solid line in FIG. 4 will be termed "the present hydrogen occluding alloy", and the hydrogen occluding alloy having the dissociation pressure characteristics shown by the broken line in FIG. 4 will be termed "the conventional hydrogen occluding alloy".

As shown clearly in FIG. 4, in the case of the conventional hydrogen occluding alloy, the temperature (hereinafter "minimum release temperature") corresponding to the minimum release pressure is rather high, being approximately 50 degrees C. As a consequence, hydrogen cannot be released by setting the temperature of the hydrogen occluding alloy at 40 degrees C. when using the conventional hydrogen occluding alloy; for this reason, the temperature of the hydrogen occluding alloy is kept higher than the minimum release temperature, e.g. approximately 60 degrees C. However, even at 60 degrees C., there is only a small difference with the minimum release temperature, and therefore, when the amount of hydrogen which should be supplied to the fuel cell 7 abruptly increases (e.g. when the vehicle accelerates or climbs a slope), a huge amount of heat must be supplied to the conventional hydrogen occluding alloy in a short period of time so that the temperature of the conventional hydrogen occluding alloy does not drop below the minimum release temperature. In this case, the method of applying heat, as in the first embodiment, by using outside air which was obtained by heat exchange with cooling water of the fuel cell 7, cannot achieve the required amount of heat in time. For this reason, another heating unit is needed in addition to the heat exchange tube 5, increasing the size and weight of the device.

In contrast, the present hydrogen occluding alloy has an extremely low minimum release temperature of less than zero degrees C., and consequently, when the temperature of the hydrogen occluding alloy is controlled to 40 degrees C., the difference with the minimum release temperature is more than 40 degrees. Therefore, in the case of the present hydrogen occluding alloy, even when the hydrogen occluding alloy is heated, as in the first embodiment, by using outside air which was obtained by heat exchange with cooling water of the fuel cell 7, the deficit amount of heat can be obtained with the heating capacity of the hydrogen occlusion tank 1 and the hydrogen occluding alloy, and the temperature of the present hydrogen occluding alloy can be prevented from falling below the minimum release temperature. Therefore, when the present hydrogen occluding alloy is used, no additional units are needed other than the hydrogen occlusion tank 1 as the heating unit and the heat exchanger (i.e. the heat exchange tube 5), which is the heat source of the cooling water of the fuel cell 7, and air can be used as the heating medium. This enables the device to be made small and light. Further, in contrast to the conventional case, where the heat discharged by the cooling water of the fuel cell 7 was merely exhausted, the present invention utilizes the discharged heat, and thereby uses energy more effectively.

Since the hydrogen occlusion tank 1 of the first embodiment is designed to withstand a pressure of 10 MPa, the temperature can be increased to approximately 120 degrees C., corresponding to the dissociation pressure of the present hydrogen occluding alloy of 10 MPa. Therefore, when filling the hydrogen occlusion tank 1 with hydrogen, the hydrogen occlusion tank 1 and the present hydrogen occluding alloy can be heated to 120 degrees C., increasing the heat radiation efficiency. Consequently, the hydrogen occlusion tank 1 can be filled with hydrogen in a short period of time even when being cooled by using air.

Figure 5:
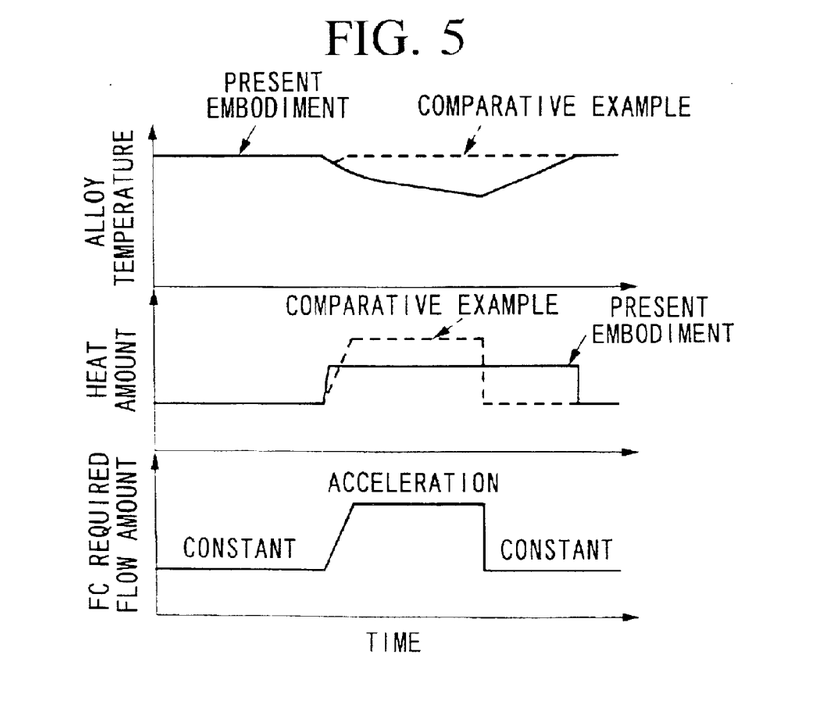
FIG. 5 is a diagram showing temporal changes in the amount of hydrogen needed by a fuel cell when a vehicle is accelerating, the amount of heat supplied for heating a hydrogen occlusion tank, and the temperature of the hydrogen occluding alloy.

FIG. 5 shows temporal changes in the amount of hydrogen flow needed by the fuel cell 7 during acceleration, the amount of heat to be supplied to the hydrogen occluding alloy in order to prevent the temperature of the hydrogen occluding alloy from dropping below the minimum release temperature, and the temperature of the hydrogen occluding alloy. In the diagrams showing the amount of heat and the temperature of the hydrogen occluding alloy, the solid lines represent the case of the present hydrogen occluding alloy, and the broken lines represent the case of the conventional hydrogen occluding alloy.

Embodiment 2

Figure 6:
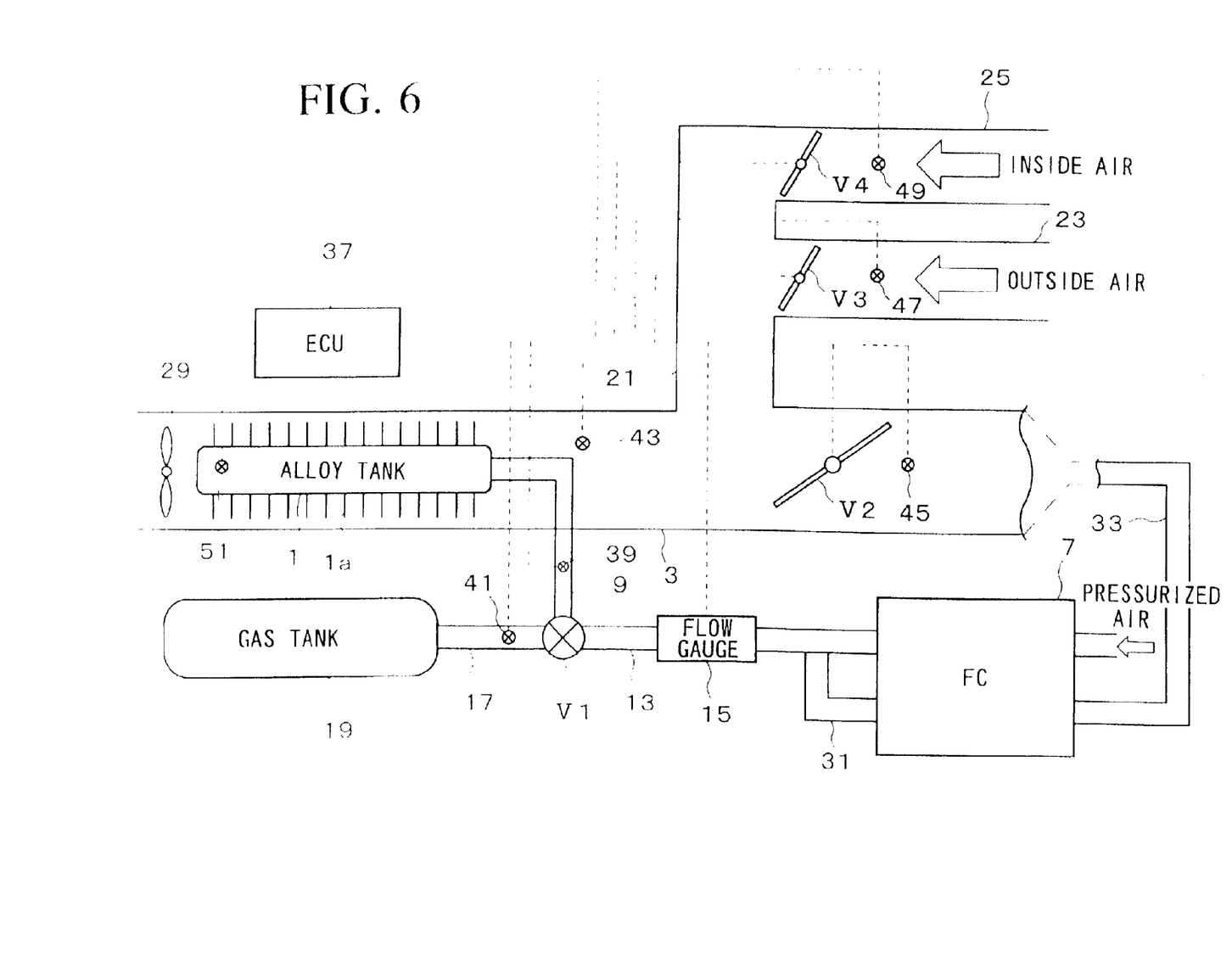
FIG. 6 is a diagram showing the constitution of a fuel cell system for vehicle comprising the hydrogen supply device according to a second embodiment of the present invention.

Subsequently, a second embodiment of the hydrogen supply device according to the present invention will be explained based on FIG. 6. The hydrogen supply device of the second embodiment differs from that of the first embodiment in respect of the source of the heating air which is supplied to the duct 3. This will be explained.

The fuel cell 7 comprises an anode and a cathode on both sides of a solid high-polymer electrolytic film; hydrogen (reaction gas) is supplied to the anode, and air (reaction gas), containing oxygen, is supplied to the cathode, the electrochemical reaction via the solid high-polymer electrolytic film generating electrical energy. In the fuel cell 7, the chemical reaction of hydrogen and oxygen produces water, which vaporizes and is exhausted with the air from the fuel cell 7 as exhaust air (hereinafter "off gas"). Since the chemical reaction also generates heat, the off gas is exhausted at a rather high temperature (e.g. 60 to 80 degrees C.). In the second embodiment, the high-temperature off gas comprising the water content is supplied to the duct 3. For this reason, the second embodiment does not comprise the heat exchange tube 5, which was provided in the duct 3 in the first embodiment. That is, in the second embodiment, the fuel cell 7 functions as a heat exchanger for heating the outside air.

Subsequently, the system constitution of the hydrogen supply device in the second embodiment will be explained with reference to FIG. 6. Hydrogen is supplied via the flow control valve 13 to the fuel cell 7, and the off gas from the hydrogen is returned via a hydrogen supply pipe 31 to the flow control valve 13.

An unillustrated supercharger pressurizes the air, which is supplied to the fuel cell 7; the pressurized air is supplied to the fuel cell 7, and off gas from the air is supplied via an air leading pipe 33 to the duct 3. Since the air, supplied to the duct 3, is pressurized, the first fan 27 need not be provided in the second embodiment. In other respects, the constitution is the same as the first embodiment, identical parts being represented in FIG. 6 by the same reference codes without further explanation.

In the hydrogen supply device of the second embodiment, as described above, the high-temperature air off gas containing water is supplied to the duct 3, and the heating air is supplied to the hydrogen occlusion tank 1 as a heating medium. Since the heated damp air containing water holds a greater amount of heat than the dry heated outside air of the first embodiment, the heat exchange between the hydrogen occlusion tank 1 and the air is more efficient than in the first embodiment, and the hydrogen occlusion tank 1 and the hydrogen occluding alloy can be heated more speedily.

Incidentally, in the second embodiment, the hydrogen occlusion tank 1 and the hydrogen occluding alloy can be kept at a constant temperature by mixing the outside air and inside air, as in the first embodiment.

Other Embodiments

The present invention is not limited to the embodiments described above. For example, the hydrogen-using apparatus is not limited to a fuel cell, and may comprise a hydrogen engine.

Compressed air, supplied to the cathode of the fuel cell as a reaction gas, may be used as the air having a different temperature. The total amount of heat generated by compressed air is not large in comparison with the heat generated by the fuel cell, but its momentary temperature is high (approximately 120 degrees C.). For example, in such cases as when the heat obtained by the fuel cell at the start of operation is not sufficient, hydrogen can be rapidly released from the hydrogen occlusion tank by supplying the compressed air thereto as the air having a different temperature. Therefore, operation can be started rapidly, and the capacity of the supplementary hydrogen tank (the hydrogen storage tank 19 in the above embodiments) can be reduced, enabling the device to be made smaller.

What is claimed is:

1. A hydrogen supply device comprising:
   a hydrogen-using apparatus which uses hydrogen;
   a hydrogen occlusion tank, which a hydrogen occluding alloy is accommodated in;
   a hydrogen supply unit which supplies hydrogen, released from said hydrogen occlusion tank, to said hydrogen-using apparatus;
   a mixing unit which mixes air warmed by heat generated when said hydrogen-using apparatus consumes hydrogen, with air having a different temperature from said warmed air; and
   a heating unit which heats said hydrogen occlusion tank by using said mixed air which is supplied through a duct.

2. The hydrogen supply device as described in claim 1, further comprising a flow control unit which controls the flow amount of said warmed air and said air having a different temperature, and the flow control unit is controlled in accordance with a temperature required by said hydrogen occluding alloy.

3. The hydrogen supply device as described in claim 1, further comprising a hydrogen storage tank which stores hydrogen, and hydrogen in the hydrogen storage tank is supplied to said hydrogen-using apparatus when the temperature of said warmed air is insufficient to release hydrogen from said hydrogen occlusion tank.

4. The hydrogen supply device as described in claim 3, wherein hydrogen in said hydrogen occlusion tank is supplied to said hydrogen storage tank when said hydrogen-using apparatus stops operating.

5. A hydrogen supply device comprising:
   a fuel cell which generates electricity and heat by the chemical reaction of hydrogen and atmospheric oxygen;

a hydrogen occlusion tank, which a hydrogen occluding alloy is accommodated in;

a hydrogen supply unit which supplies hydrogen, released from said hydrogen occlusion tank, to said fuel cell;

a mixing unit which mixes air warmed by heat generated when said fuel cell generating electrical energy, with air having a different temperature from said warmed air; and a heating unit which heats said hydrogen occlusion tank by using said mixed air which is supplied through a duct.

6. The hydrogen supply device as described in claim 5, wherein said warmed air comprises exhaust air containing water, exhausted from said fuel cell.

7. The hydrogen supply device as described in claim 5, wherein compressed air which is supplied to said fuel cell as a reaction gas is used as said air having a different temperature, and the compressed air having a temperature higher than that of said warmed air is supplied to said hydrogen occlusion tank when the heat from said heating unit is insufficient to release hydrogen from said hydrogen occlusion tank.

8. The hydrogen supply device as described in claim 5, wherein a coolant which cools the heat generated by said fuel cell is provided, and said warmed air is air fed by a fan which cools the coolant.

* * * * *